United States Patent
Sishtla

(10) Patent No.: US 6,901,957 B2
(45) Date of Patent: Jun. 7, 2005

(54) HOT GAS BYPASS ISOLATION

(75) Inventor: Vishnu M. Sishtla, Manlius, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/628,157

(22) Filed: Jul. 28, 2003

(65) Prior Publication Data

US 2005/0022881 A1 Feb. 3, 2005

(51) Int. Cl.[7] ............................................. F16L 55/00
(52) U.S. Cl. ................... 137/613; 137/599.11
(58) Field of Search .................... 137/613, 599.11, 137/599.01, 599.12, 599.13, 599.14, 599.15, 137/625.28, 625.29

(56) References Cited

U.S. PATENT DOCUMENTS

| | | | | |
|---|---|---|---|---|
| 4,230,154 A | * | 10/1980 | Kalbfleish | ............... 137/614.17 |
| 4,301,731 A | * | 11/1981 | Fitzgerald | ................... 102/330 |
| 5,056,554 A | * | 10/1991 | White | .................... 137/599.05 |
| 5,586,579 A | | 12/1996 | Diehl | |
| 6,591,851 B1 | * | 7/2003 | Palten et al. | ........... 137/599.11 |
| 2002/0157407 A1 | | 10/2002 | Weng | |

FOREIGN PATENT DOCUMENTS

| | | |
|---|---|---|
| EP | 1 103 296 A | 5/2001 |
| EP | 1 262 348 A | 12/2002 |
| EP | 1 300 639 A | 4/2003 |
| GB | 2 226 385 A | 6/1990 |

* cited by examiner

Primary Examiner—Kevin Lee
(74) Attorney, Agent, or Firm—Bachman & LaPointe, PC

(57) ABSTRACT

A bypass line assembly comprising a bypass line for transporting a gas in a flow direction, a bypass valve located at a position along the bypass line, and a manual throttle valve located upstream from the bypass valve, the manual throttle valve comprising a throttle valve ball comprising a pressure release passage.

7 Claims, 2 Drawing Sheets

US 6,901,957 B2

HOT GAS BYPASS ISOLATION

BACKGROUND OF THE INVENTION (1) Field of the Invention

The present invention relates to bypass line assembly incorporating a manual throttle valve modified to contain a hole extending through the throttle valve ball to reduce the incidence of overpressure failure.

(2) Description of Related Art

It is common in the art of refrigeration units to employ water cooled chillers which have a hot gas bypass arrangement. The use of such a hot gas bypass arrangement allows for the stable operation of the water cooled chillers at low loads. The hot gas bypass valve is activated by the chiller control system to open when the load falls below a certain predefined level. As such, the hot gas bypass valve may either be in an "on" or an "off" position. It is sometimes preferable, however, to achieve finer control over the operation of the hot gas bypass valve. To achieve such fine control, a manual ball valve is used in series with the hot gas bypass valve. During shutdown of the assembly, liquid can get trapped between the ball valve and the hot gas bypass valve. In the event that both the manual ball valve and the hot gas bypass valve are shutoff and the pipe adjoining the two valves is subject to heating for example from the ambient air, high pressure can result and the assembly can experience failure. Specifically, the assembly is prone to failures due to excessive pressure in the line connecting the hot gas bypass valve to the manual ball valve.

What is therefore needed is a method for relieving the pressure which may develop between the manual ball valve and the hot gas bypass valve which does not sacrifice the low load requirement.

SUMMARY OF THE INVENTION

Accordingly, it is an object of the present invention to provide a bypass line assembly incorporating a manual throttle valve modified to contain a hole extending through the throttle valve ball to reduce the incidence of overpressure failure.

It is a further object of the present invention to provide a bypass line assembly which comprises a bypass line for transporting a gas in a flow direction, a bypass valve located at a position along the bypass line, and a manual throttle valve located upstream from the bypass valve, the manual throttle valve comprising a throttle valve ball comprising a pressure release passage.

DETAILED DESCRIPTION OF THE PREFERRED EMBODIMENT(S)

It is therefore a central purpose of the present invention to teach a manual throttle valve for inclusion in series with a "hot gas" bypass valve wherein the main throttle valve is adapted to avoid failure of the hot gas bypass line. Specifically, the manual throttle valve is modified by drilling or otherwise providing a hole through the throttle valve ball contained within the manual throttle valve to allow excessive liquid or gas pressure to be relieved. While described with reference to the condenser of a refrigeration unit, the modified manual throttle valve of the present invention is not so limited. Rather, the present invention relates to any and all assemblies through which gas or liquid may pass at a pressure wherein the assembly contains two valves located in series, one of the valves having been modified as described above to contain a hole or passage to allow gas flow and thereby avoid overpressure.

Figure 1:
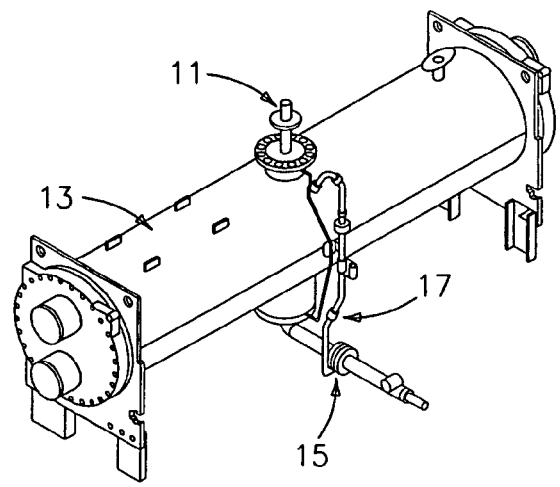
FIG. 1 is an illustration of the condenser and hot gas bypass assembly of the present invention.

With reference to FIG. 1, there is illustrated a condenser 13 and hot gas bypass line assembly 17 of the present invention. At either terminus of hot gas bypass line 17 there is located the condenser isolation valve 11 and the cooler isolation valve 15. In operation, gas and liquid travels through the hot gas bypass line 17 from the condenser isolation valve 11 to the cooler isolation valve 15.

Figure 2:
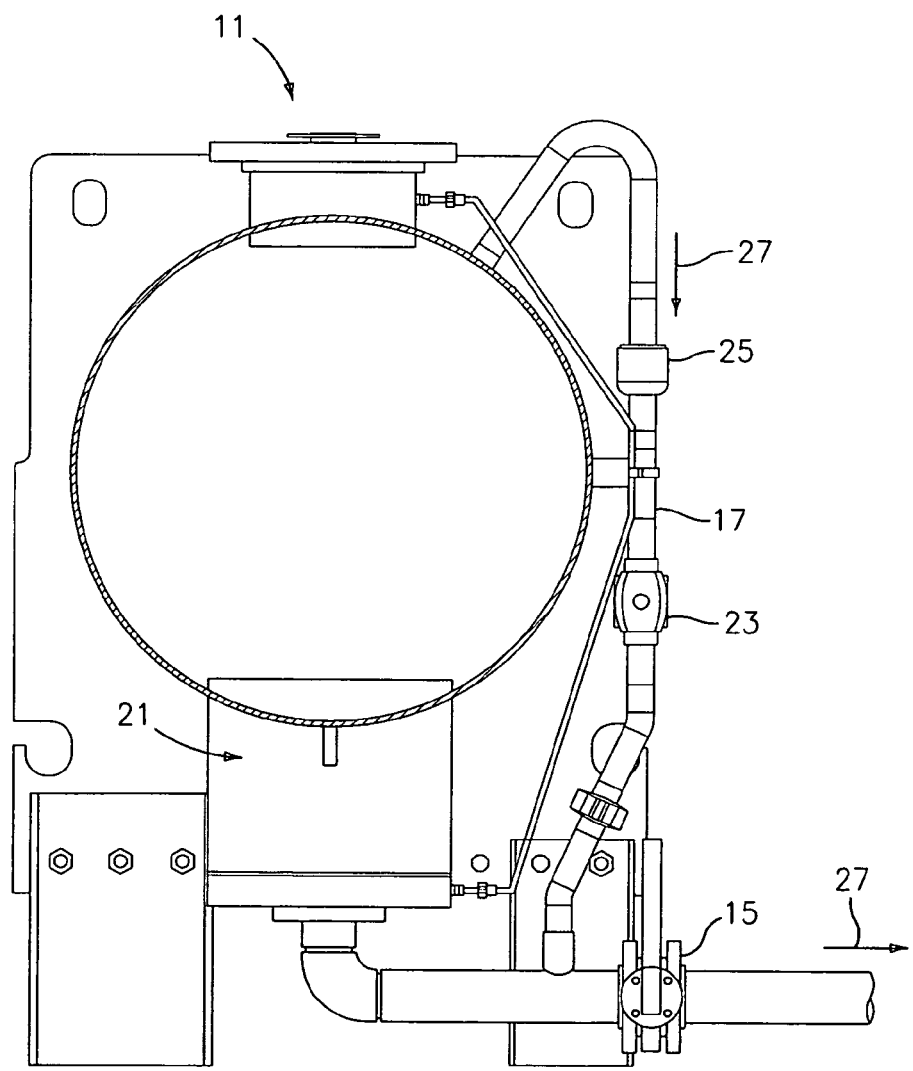
FIG. 2 is a cross-section diagram of the condenser and hot gas bypass assembly of the present invention.

With reference to FIG. 2, there is shown in detail the hot gas bypass line 17 of the present invention. Central components of the hot gas bypass line 17 include bypass valve 23 and manual throttle valve 25. In addition, there is indicated the hot gas bypass flow direction 27. Gas and liquid travel from high pressure to low pressure in the direction of hot gas bypass flow direction 27 towards the cooler as shown by the arrow mark.

When the compressor load is reduced below a certain predefined load, the bypass valve 23 is energized so as to open. Bypass valve 23 may typically be maintained in either a fully open or fully closed position. In order to finely control the flow through bypass valve 23, manual throttle valve 25 is installed upstream of the bypass valve 23.

During shutdown of the compressor 11, the refrigerant charge is maintained inside of the condenser and the isolation valves 11, 15 are closed. If, at such times, the manual throttle valve 25 is closed, liquid can be trapped between the bypass valve 23 and the manual throttle valve 25. In such a case, the ambient temperature outside of hot gas bypass line 17 can heat the liquid and in turn raise the pressure of the liquid beyond a value that can cause failure of hot gas bypass line 17. Typically, such a failure of hot gas bypass line 17 can result in a loss of refrigerant equivalent to approximately 1200 to 1500 pounds and, in addition, can pose a significant safety hazard.

Figure 3:
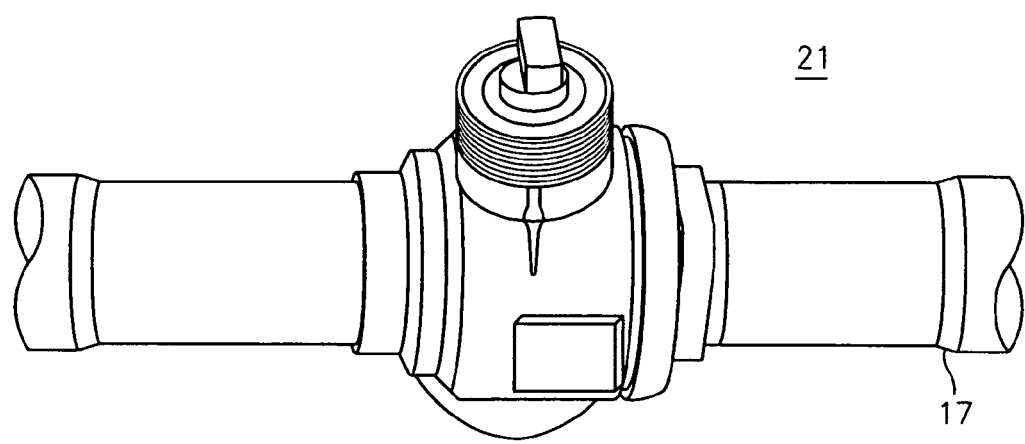
FIG. 3 is a perspective view of the manual throttle valve of the present invention.
Figure 4:
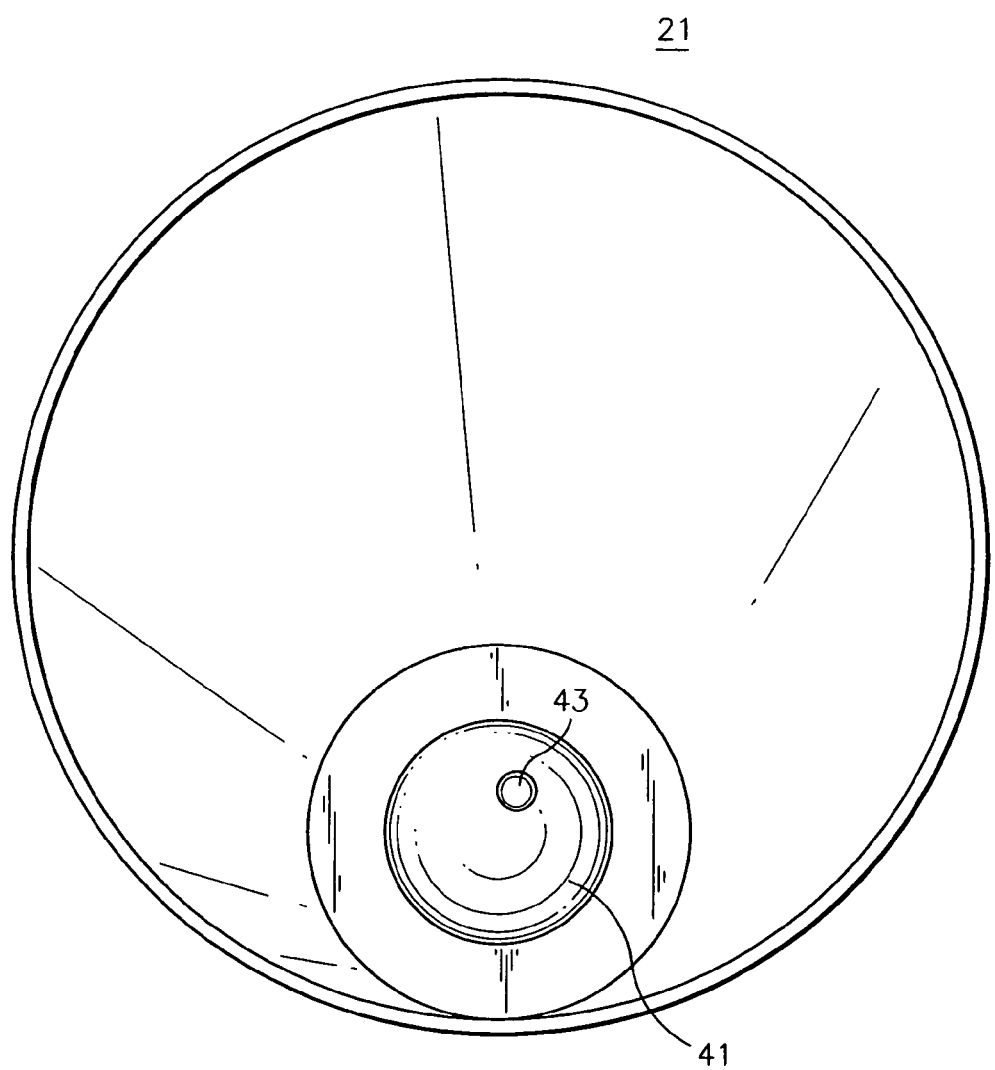
FIG. 4 is a perspective view of the throttle valve ball of the present invention.

With reference to FIG. 3, there is illustrated a manual throttle valve 25 of the present invention. Manual throttle valve 25 contains a throttle valve ball 41. With reference to FIG. 4, there is illustrated in detail the throttle valve ball 41 contained inside of the manual throttle valve 25 of the present invention. Most particularly, there is illustrated a gas flow means 43 for allowing flow of gas out of the portion of bypass line 17 which is between bypass valve 23 and manual throttle valve 25. In a preferred embodiment, gas flow means 43 consists of a cylindrical hole or other opening drilled through throttle valve ball 41 such that gas flow means 43 forms an opening extending entirely through throttle valve ball 41. In a preferred embodiment, gas flow means 43 comprises a hole which is machined or otherwise drilled in a circular form through throttle valve ball 41. With the manual throttle valve 25 in a fully closed position, the axis of the hole is oriented parallel to the hot gas bypass line assembly 17. The function of the hole is to provide a passage for fluid when the manual throttle valve 25 is closed. The hole comprising gas flow means 43 is preferably between 0.060 inches and 0.185 inches in diameter. Most preferably, the hole is approximately 0.125 inches in diameter.

It is apparent that there has been provided in accordance with the present invention a hot gas bypass isolation which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A bypass line assembly comprising:
   a bypass line for transporting a gas in a flow direction;
   a bypass valve located at a position along said bypass line; and
   a manual throttle valve located upstream from said bypass valve, said manual throttle valve comprising a throttle valve ball comprising a pressure release passage.

2. The bypass line assembly of claim 1 wherein said gas flow means comprises a hole extending through said throttle valve ball.

3. The bypass line assembly of claim 2 wherein said hole is circular.

4. The bypass line assembly of claim 2 wherein a diameter of said hole is between 0.060 inches and 0.185 inches.

5. The bypass line assembly of claim 4 wherein said diameter is approximately 0.125 inches.

6. The bypass line assembly of claim 1 wherein said pressure release passage extends through said bypass line.

7. The bypass line assembly of claim 1 wherein said gas flowing opposite said flow direction through said pressure release passage remains within said bypass line.

\* \* \* \* \*